United States Patent
Au et al.

(10) Patent No.: US 10,271,331 B2
(45) Date of Patent: Apr. 23, 2019

(54) SYSTEM AND METHOD FOR TRANSMISSION TIME INTERVALS

(71) Applicant: Huawei Technologies Co., Ltd., Shenzhen (CN)

(72) Inventors: Kelvin Kar Kin Au, Kanata (CA); Liqing Zhang, Ottawa (CA); Jianglei Ma, Ottawa (CA); Keyvan Zarifi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/108,589

(22) Filed: Aug. 22, 2018

(65) Prior Publication Data

US 2018/0359752 A1     Dec. 13, 2018

Related U.S. Application Data

(63) Continuation of application No. 15/452,514, filed on Mar. 7, 2017, which is a continuation of application (Continued)

(51) Int. Cl.
*H04W 72/04* (2009.01)
*H04W 48/00* (2009.01)
(Continued)

(52) U.S. Cl.
CPC ....... *H04W 72/0446* (2013.01); *H04L 1/1864* (2013.01); *H04L 5/14* (2013.01);
(Continued)

(58) Field of Classification Search
None
See application file for complete search history.

(56) References Cited

U.S. PATENT DOCUMENTS

2009/0161649 A1    6/2009  Ponnathota et al.
2009/0323564 A1*  12/2009  Chiu .................... H04L 1/1812
                                                                370/280
(Continued)

FOREIGN PATENT DOCUMENTS

CN    102598824 A    7/2012
CN    102932874 A    2/2013
(Continued)

*Primary Examiner* — Kenny S Lin
(74) *Attorney, Agent, or Firm* — Slater Matsil, LLP

(57) ABSTRACT

In one embodiment, a method for adaptive transmission time intervals (TTIs) includes transmitting, by a communications controller to a user equipment (UE), a segment of a first TDD TTI configuration of a first TDD interval and a second TDD TTI configuration of the first TDD interval, where the first TDD TTI configuration has a first pattern, where the second TDD TTI configuration has a second pattern, where the first pattern is different than the second pattern, where the first TDD TTI configuration has a first uplink TTI segment and a first downlink TTI segment. The method also includes transmitting a first plurality of data on a first TTI in the first downlink TTI segment of the first TDD TTI configurations of the first TDD interval and receiving a second plurality of data on the first uplink segment of the first TDD TTI configuration of the first TDD interval.

26 Claims, 8 Drawing Sheets

Related U.S. Application Data

No. 14/630,253, filed on Feb. 24, 2015, now Pat. No. 9,629,066.

(51) Int. Cl.
*H04L 1/18* (2006.01)
*H04L 5/14* (2006.01)
*H04W 28/06* (2009.01)
*H04W 72/12* (2009.01)

(52) U.S. Cl.
CPC ......... *H04W 48/00* (2013.01); *H04W 72/042* (2013.01); *H04W 72/0413* (2013.01); *H05K 999/99* (2013.01); *H04W 28/06* (2013.01); *H04W 72/12* (2013.01)

(56) References Cited

U.S. PATENT DOCUMENTS

| | | |
|---|---|---|
| 2011/0177821 A1 | 7/2011 | Senarath et al. |
| 2012/0300641 A1 | 11/2012 | Chen et al. |
| 2014/0071954 A1 | 3/2014 | Au et al. |
| 2014/0153450 A1 | 6/2014 | Jang et al. |
| 2015/0135773 A1 | 5/2015 | Jaenecke |
| 2015/0334686 A1 | 11/2015 | Ji et al. |
| 2016/0095105 A1 | 3/2016 | Chen et al. |
| 2017/0288819 A1* | 10/2017 | Chen ................ H04L 1/1854 |
| 2017/0332373 A1* | 11/2017 | Patel ................ H04L 1/1861 |
| 2018/0219654 A1* | 8/2018 | Chen ................ H04L 5/0012 |

FOREIGN PATENT DOCUMENTS

| | | |
|---|---|---|
| EP | 1938493 B1 | 10/2014 |
| JP | 2017530635 A | 10/2017 |
| KR | 20100050560 A | 5/2010 |
| KR | 20140023400 A | 2/2014 |
| WO | 2007025160 A2 | 3/2007 |
| WO | 2010047511 A2 | 4/2010 |
| WO | 2013127634 A1 | 9/2013 |
| WO | 2014040531 A1 | 3/2014 |
| WO | 2014142588 A1 | 9/2014 |

* cited by examiner

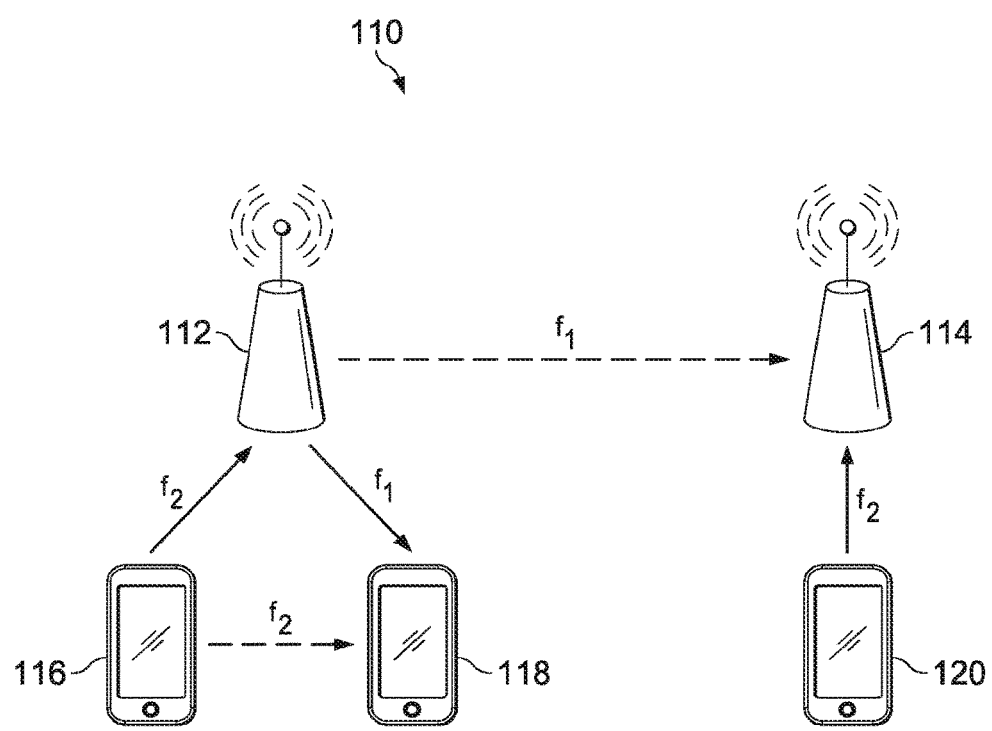
FIG. 5
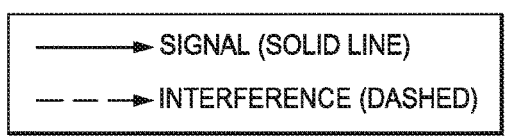

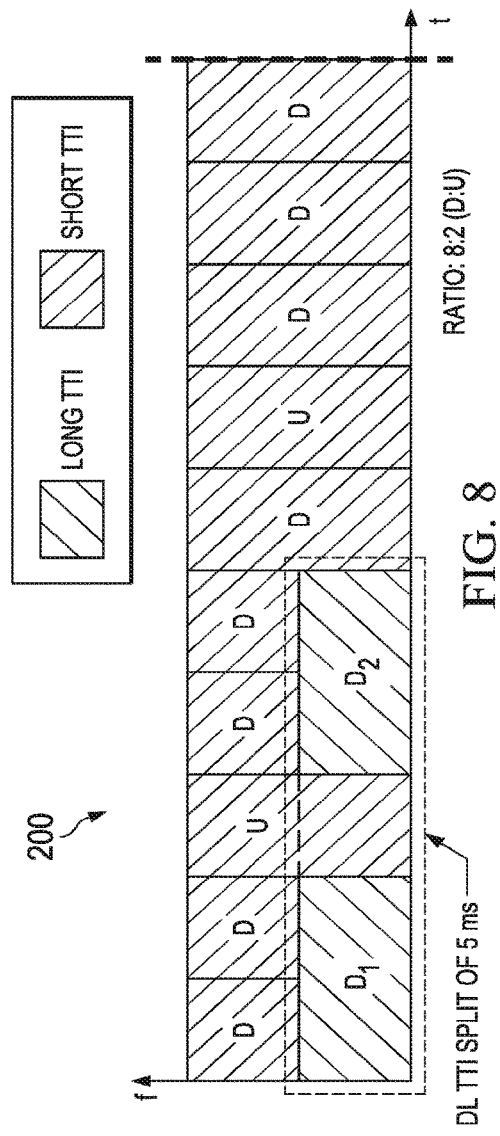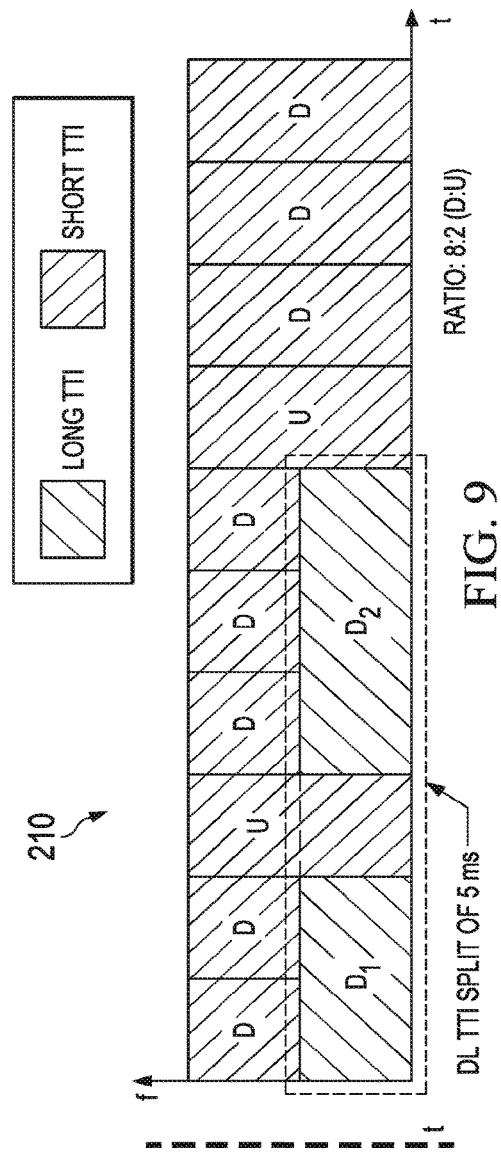

SYSTEM AND METHOD FOR TRANSMISSION TIME INTERVALS

CROSS-REFERENCE TO RELATED APPLICATIONS

This application is a continuation of U.S. application Ser. No. 15/452,514, filed on Mar. 7, 2017, and entitled "System and Method for Transmission Time Intervals," which is a continuation of U.S. application Ser. No. 14/630,253, filed on Feb. 24, 2015 (now U.S. Pat. No. 9,629,066, issued Apr. 18, 2017), and entitled "System and Method for Transmission Time Intervals," all of which applications are hereby incorporated herein by reference.

TECHNICAL FIELD

The present invention relates to a system and method for wireless communications, and, in particular, to a system and method for transmission time intervals.

BACKGROUND

Modern wireless networks support communication of diverse traffic types (e.g., voice, data, etc.) which have different latency requirements, with overall network and channel throughput requirements. Transmission time intervals (TTIs) with fixed lengths are not flexible for diverse traffic characteristics with different latency requirements.

In long term evolution (LTE) time division duplex (TDD), hybrid automatic repeat request (HARQ) feedback delay is variable, depending on the downlink (DL)/uplink (UL) configurations. A DL/UL configuration may be a pre-defined pattern of UL and DL TTIs over a radio frame, which may contain 10 TTIs. A DL/UL configuration provides a certain DL: UL traffic ratio. Based on the DL and UL TTIs' arrangements, a DL data transmission may be acknowledged in the next available UL TTI after taking into account the processing delay. A similar situation occurs for UL data transmissions. Thus, the HARQ feedback delay is not fixed. Also, due to the processing delay, the feedback may be longer than the fixed delay in the FDD system.

In Worldwide Interoperability for Microwave Access (WiMAX) TDD, every TDD frame (c.f. TTI in LTE) contains a downlink subframe and an uplink subframe. The duration of a TDD frame is fixed. Although the duration of the WiMAX TDD frame structure provides a fixed HARQ feedback delay, the existence of DL and UL subframes in the frames represents an overhead. It is desirable to have flexibility to accommodate different latency and dynamic signaling overhead based on different traffic characteristics.

SUMMARY

An embodiment method for adaptive transmission time intervals (TTIs) includes transmitting, by a communications controller to a user equipment (UE), a segment of a first TDD TTI configuration of a first TDD interval and a second TDD TTI configuration of the first TDD interval, where the first TDD TTI configuration has a first pattern, where the second TDD TTI configuration has a second pattern, where the first pattern is different than the second pattern, where the first TDD TTI configuration has a first uplink TTI segment and a first downlink TTI segment, where the second TDD TTI configuration has a second uplink TTI segment and a second downlink TTI segment, where the first downlink TTI segment has a first TTI size, and where the first uplink TTI segment has a second TTI size. The method also includes transmitting, by the communications controller to the UE, a first plurality of data on a first TTI in the first downlink TTI segment of the first TDD TTI configurations of the first TDD interval and receiving, by the communications controller from the UE, a second plurality of data on the first uplink segment of the first TDD TTI configuration of the first TDD interval.

An embodiment method for adaptive transmission time intervals (TTIs) includes receiving, by a user equipment (UE) from a communications controller, a first TDD TTI configuration for a first TDD interval, where the first TDD interval includes a first uplink segment, a first downlink segment, and a first TTI, where the first downlink segment has a first TTI size and a second TTI size, and where the first TTI size is not equal to the second TTI size. The method also includes transmitting, by the UE to the communications controller, a first plurality of data on the first uplink segment and receiving, by the UE from the communications controller, a second plurality of data on the first TTI of the first downlink segment.

An embodiment communications controller includes a processor and a non-transitory computer readable storage medium storing programming for execution by the processor. The programming including instructions to transmit, to a user equipment (UE), a segment of a first TDD TTI configuration of a first TDD interval and a second TDD TTI configuration of the first TDD interval, where the first TDD TTI configuration has a first pattern, where the second TDD TTI configuration has a second pattern, where the first pattern is different than the second pattern, where the first TDD TTI configuration has a first uplink TTI segment and a first downlink TTI segment, where the second TDD TTI configuration has a second uplink TTI segment and a second downlink TTI segment, where the first downlink TTI segment has a first TTI size, and where the first uplink TTI segment has a second TTI size. The programming also includes instructions to transmit, to the UE, a first plurality of data on a first TTI in the first downlink TTI segment of the first TDD TTI configurations of the first TDD interval and receive, by the communications controller from the UE, a second plurality of data on the first uplink segment of the first TDD TTI configuration of the first TDD interval.

An embodiment user equipment (UE) includes a processor and a non-transitory computer readable storage medium storing programming for execution by the processor. The programming including instructions to receive, from a communications controller, a first TDD TTI configuration for a first TDD interval, where the first TDD interval includes a first uplink segment, a first downlink segment, and a first TTI, where the first downlink segment has a first TTI size and a second TTI size, and where the first TTI size is not equal to the second TTI size. The programming also includes instructions to transmit, by the UE to the communications controller, a first plurality of data on the first uplink segment and receive, by the UE from the communications controller, a second plurality of data on the first TTI of the first downlink segment.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 illustrates an embodiment system with cross-carrier interference;

FIG. 8 illustrates TTI splitting with the TTI length in one direction including the time of TTI and feedback slots in the other direction;

FIG. 9 illustrates TTI splitting with the TTI length in one direction excluding the time of TTI and feedback slots in the other direction;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An example wireless network uses fixed length transmission time intervals (TTIs) for time division duplex (TDD). For example, networks operating under third generation partnership (3GPP) long term evolution (LTE) use one millisecond TTIs. The length of the TTI affects latency performance and throughput performance of the network. Specifically, shorter transport containers achieve superior latency performance by providing more frequent transmission opportunities, while longer TTIs achieve superior throughput performance by reducing signaling overhead.

Adaptive TTIs provide flexibility to accommodate different link latency and dynamic signaling overhead based on different traffic characteristics. Dynamic signaling overhead associated with a TTI includes information such as resource allocation information, modulation and coding set (MCS) assignments, etc. The shorter the TTIs, the more frequently the dynamic signaling are sent. In adaptive TTI, different TTI lengths co-exist in the same system. The terms "TTI lengths" and "TTI sizes" may be used interchangeably. Adaptive TTI may be incorporated into a TDD system providing the benefit of flexibility in adapting the dynamic signaling overhead to different traffic types while supporting low latency hybrid automatic repeat request (HARQ) feedback.

In one example, adaptive TTI is used in frequency division duplexing (FDD). Additional details on adaptive TTI in FDD are provided by U.S. patent application Ser. No. 13/611,823 filed on Sep. 12, 2012, and entitled "System and Method for Adaptive Transmission Time Interval (TTI) Structure," which application is hereby incorporated herein by reference.

Figure 1:
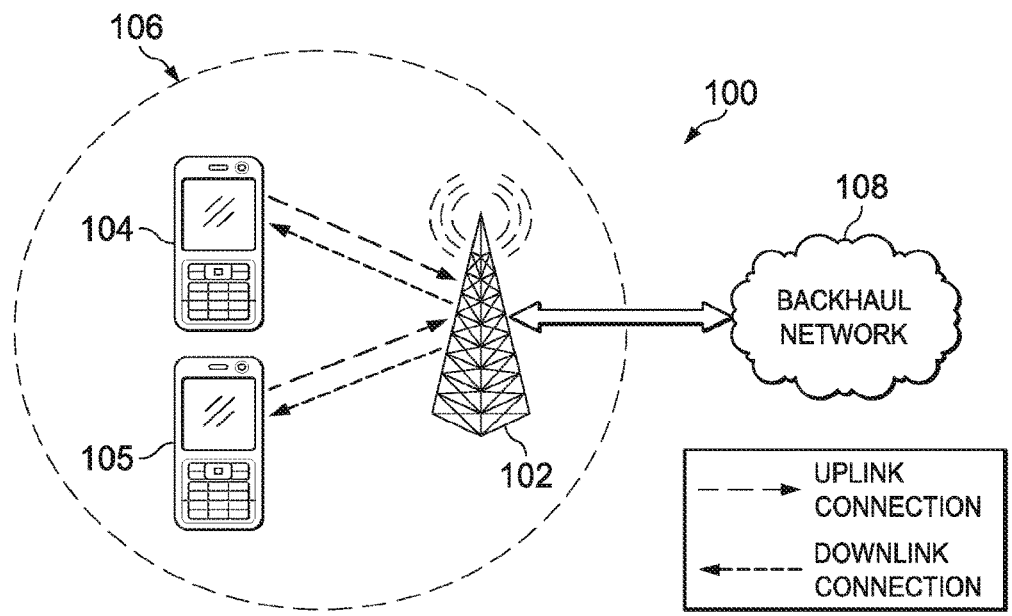
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by, inter alia, establishing uplink (dashed line) and/or downlink (dotted line) connections with UE 104 and UE 105, such as a base station, an enhanced base station (eNB), an access point, a picocell, a femtocell, and other wirelessly enabled devices. UE 104 and UE 105 may be any component capable of establishing a wireless connection with communications controller 102, such as cell phones, smart phones, tablets, sensors, etc. The downlink communication channel may carry data channels (e.g., physical downlink shared channel (PDSCH), etc.) and control channels (e.g., a physical downlink shared channel (PDCCH), etc.). More specifically, the control channels may include UE or group specific control channels and common control channels which carry downlink control information to the UEs and/or relays, as well as uplink related control channels which carry various uplink control information to the UEs, such as HARQ, acknowledge/negative acknowledgement (ACK/NACK), uplink grant, etc. Backhaul network 108 may be any component or collection of components that allow data to be exchanged between communications controller 102 and a remote end. In some embodiments, the network 100 may include various other wireless devices, such as relays, femtocells, etc.

Long TTIs may be problematic in a TDD system. For example, the HARQ feedback delay for a downlink transmission in the presence of a long downlink TTI, for example 5 ms, is longer than that of a short TTI, for example 0.5 ms. TTI splitting may be used.

Figure 2:
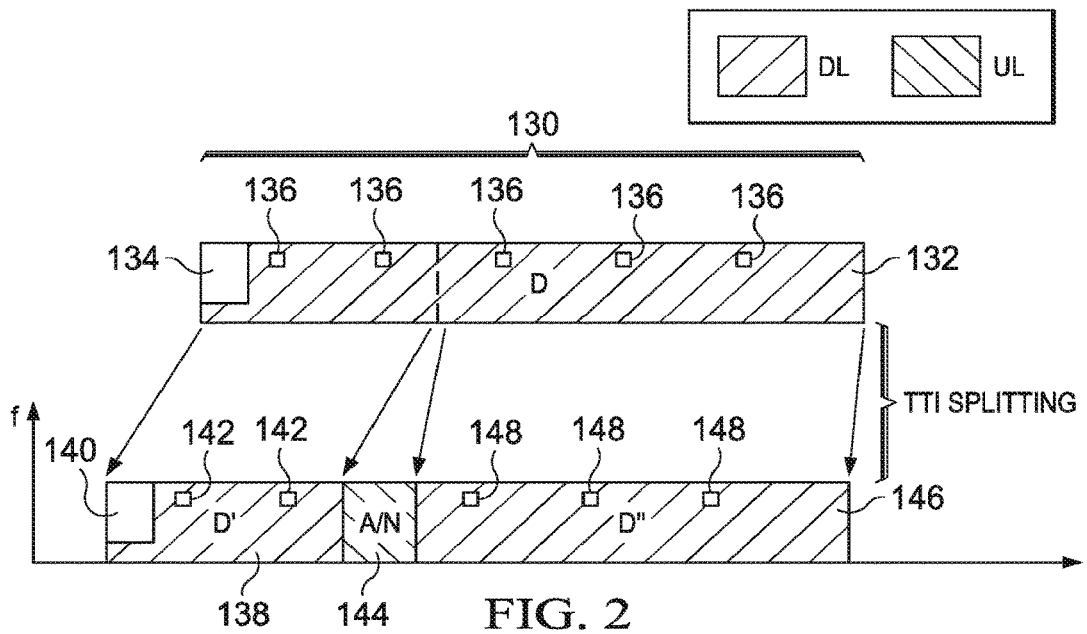
FIG. 2 illustrates transmission time interval (TTI) splitting for a downlink frame.

An embodiment TTI contains control channels, data channels, and pilots for the receiver to estimate the wireless channel. Examples of control channels include resource assignments, scheduling requests, and HARQ feedback. FIG. 2 illustrates TTI splitting for downlink. In downlink TTI, data is encoded for the entire TTI duration in frame 130, which contains data channels 132, control channels 134, and pilots 136. The TTI is then split up by potential slots for HARQ feedback, for example ACK(A)/NACK(N) region 144. Data channels are split into region 138 and region 146 with pilots 142 and pilots 148, control channels 140, and A/N 144. Guard periods, for example one orthogonal frequency division multiplexing (OFDM) symbol, are inserted to facilitate switching between uplink and downlink transmission. TTI splitting may be applied in other situations. For example, a short TTI of the reverse direction may be inserted. Transmit and receive processing is performed over the entire TTI length. For example, a downlink TTI containing region 138 and region 146 are processed together at the receiver. The regions are not separate TTIs with their own control, data, and pilot channels, but share control channels and pilots. The reduction of control channel overhead from a long TTI is preserved.

Figure 3:
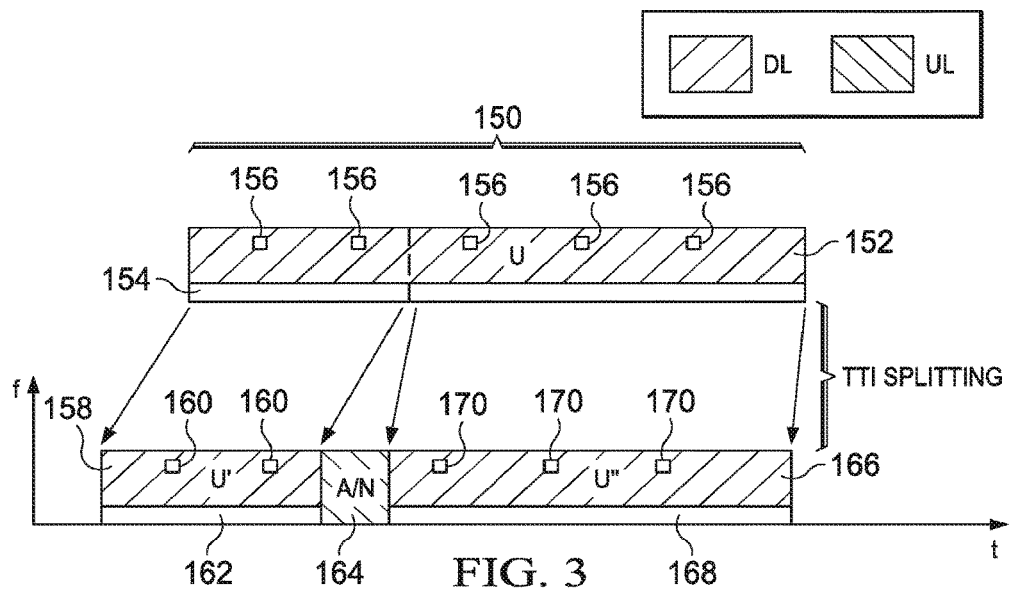
FIG. 3 illustrates TTI splitting for an uplink frame.

FIG. 3 illustrates TTI splitting for uplink. The uplink TTI is split by HARQ feedback slots acknowledging previous data transmissions. Frame 150 contains data region 152, control region 154, and pilots 156. TTI splitting is performed to produce regions 158 and 166 with pilots 160 and 170, and control regions 162 and 168. A/N region 164 is between region 158 and region 166.

In one example using LTE OFDM, the useful symbol duration is 66.7 μs. An example circuit switching time is about 20 μs, and the speed of light is 3×108 m/s. When a guard period is one OFDM symbol, the distance transmitted may be (symbol duration−circuit switching time)*(speed of light)=(66.7 μs−20 μs)*3×108 m/s=14 km. This is a long distance for wireless networks. Therefore, the switching overhead may be much smaller than the LTE OFDM symbol duration.

Figure 4:
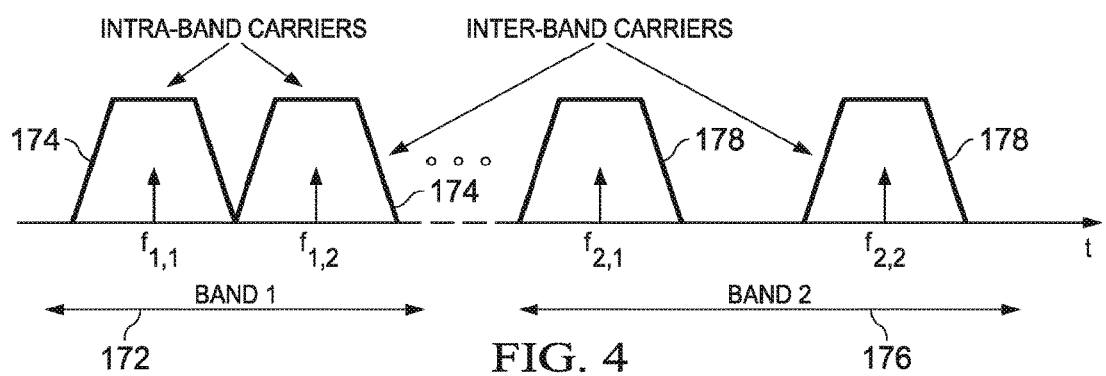
FIG. 4 illustrates intra-band carriers and inter-band carriers.

Wireless networks may support operation on different frequency bands. The different carrier frequencies exist within a frequency band allocated to an operator. In other examples, they may exist on different frequency bands, depending on the spectrum allocation. FIG. 4 illustrates intra-band and inter-band carriers. Intra-band carriers 174 have frequencies f1,1 and f1,2 in band 172. Inter-band carrier frequencies span band 172 and band 176, which has carriers 178. An example pair of inter-band carriers is f1,2 and f2,2.

In a single carrier TDD system, uplink and downlink traffic are carried on the same carrier frequency. Thus, the HARQ feedback slots are inserted in the TTI using the TTI splitting mechanism on the same carrier.

In an intra-band multi-carrier TDD system, there is strong cross-carrier interference when different TDD configurations are applied to the different carriers. FIG. 5 illustrates system 110 with communications controller 112 and 114. Communications controller 112 communicates with UEs 116 and 118, while communications controller 114 communicates with UE 120. There may be interference between communications controller 112 and communications controller 114, and also between UE 116 and UE 118. When there is a downlink transmission on carrier f1 from communications controller 112 to UE 118 at time t, it generates interference to communications controller 114. Also, an uplink transmission on carrier f2 from UE 116 to communications controller 112 at time t is due to a different TDD configuration. Example frequency bands may be around 2.1 GHz and around 700 MHz. Communications controller 114 receives an uplink transmission on f2 in the presence of a strong interference from f1 due to the non-negligible intra-band interference between f1 and f2. Similarly, there is interference from f2 to f1 at UE 118. Although the uplink to downlink interference is weaker due to the lower transmit power of a UE relative to a communications controller, when there are two UEs in close proximity, the interference may be substantial. Thus, in intra-band multi-carrier TDD, it is desirable for the TDD configuration for different carriers be the same. HARQ feedback slots inserted in a TTI for f1 are applied to f2. The intra-band multi-carrier example may be viewed as an extension of the single-carrier case.

Figure 6:
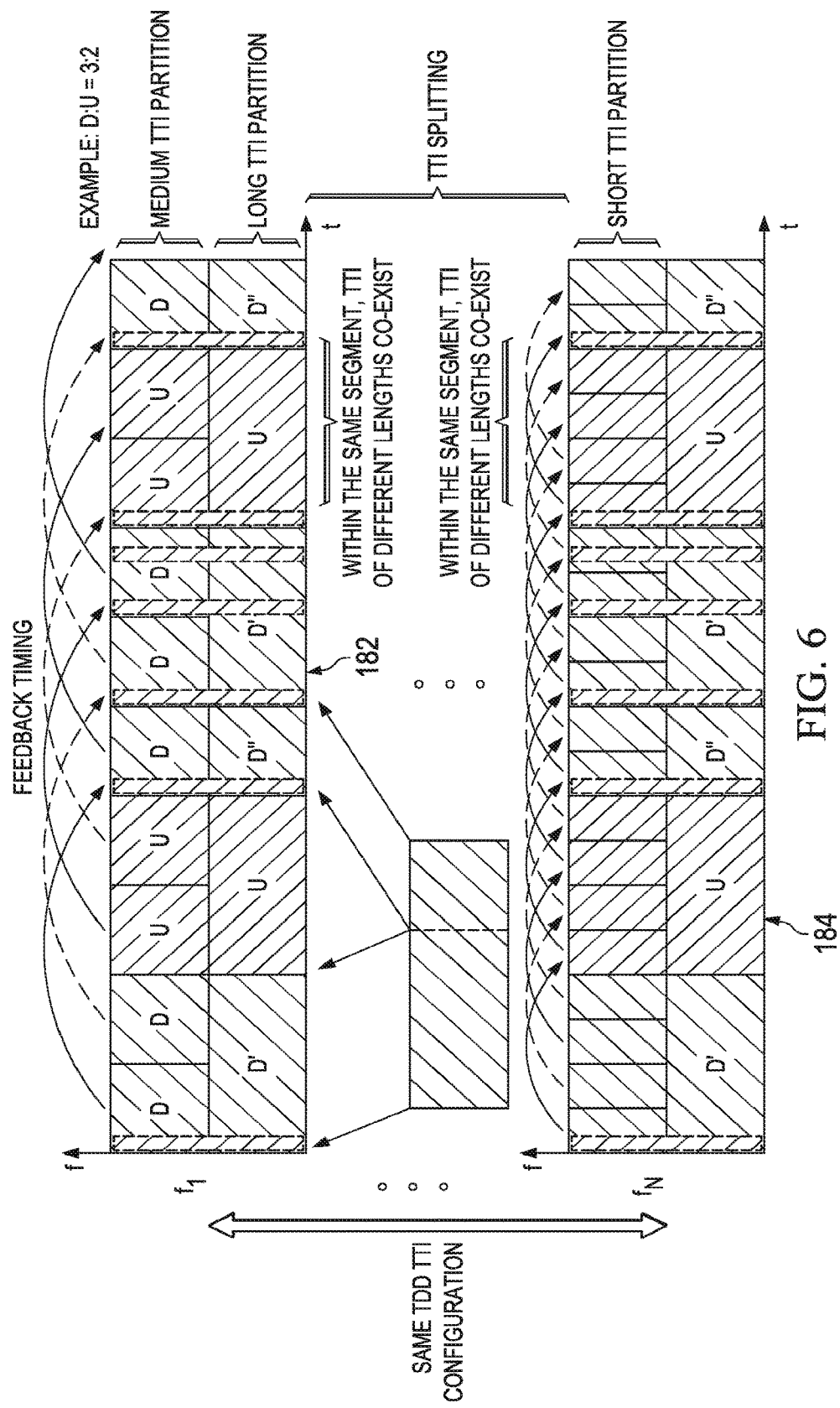
FIG. 6 illustrates the application of the same time division duplex (TDD) configuration on different carriers.

In a fixed TTI structure for a TDD system, such as LTE, a TDD downlink/uplink configuration defines an exact pattern of downlink and uplink TTIs within a time interval such as a radio frame of 10 ms. Applying the same TDD configuration to different carriers leads to the uplink and downlink TTI patterns being uniform. In an adaptive TTI structure with the coexistence of different TTI lengths, the concept of a TDD TTI segment is introduced. A TDD TTI segment contains one or more TTI(s) of the same transmission direction (e.g. uplink or downlink). When the uplink and downlink TTI segments are the same across different carriers, different TTI lengths coexist within a segment. In an embodiment, a TDD TTI configuration defines the pattern of the downlink and uplink TTI segments within a time interval. In another embodiment, a TDD TTI configuration defines the exact pattern of downlink and uplink adaptive TTIs (i.e. different TTI lengths in the configuration are defined, not just the segments). FIG. 6 illustrates different TTI lengths in an adaptive TTI structure with the same TDD TTI configuration for different frequencies in an embodiment. Frame 184 contains short and long TTI partitions. With the same TDD TTI segments, frame 182 contains medium and long TTI partitions. The frames have downlink to uplink ratios of 3:2. During the downlink direction, the TTI lengths (short, medium, and long) may be configured from f1 to fN.

Feedback slots are configured to provide a constant feedback delay for HARQ feedback. Configurable feedback slots provide low latency feedback for delay sensitive traffic. A feedback slot is associated with one or more TTI size(s) in the system, and may depend on traffic types and Quality of Service (QoS) (e.g. latency requirement). In the example illustrated by FIG. 6, feedback slots are configured for the medium and short TTIs. The fixed feedback timing is four TTIs in this example. For long TTIs, feedback slots might not be configured. The feedback delay, in this case, is varied in accordance with the TDD TTI configuration, because long TTIs may carry traffic that is not delay sensitive. Thus, long TTIs may tolerate less stringent feedback delay requirements. The network may configure feedback slots for a set of TTI lengths. The feedback delay timing may also be configured.

The feedback slot associated with the TTI length and the delay timing may be controlled by the network based on the TDD TTI configuration. To reduce the overhead of switching between downlink and uplink transmission from feedback slots, the existence of the feedback slots may be controlled dynamically, for example every radio frame. In an example, when there is no data for traffic types which require a consistent low latency feedback, the network may signal the UEs to disable feedback slots during this time interval (e.g. a radio frame). The signaling may be accomplished with a feedback slot switching flag (e.g. a 1-bit indicator). It may be transmitted in a control channel via broadcast, multi-cast, or unicast. Thus, the overall feedback slots may be configured statically/semi-statically with TDD TTI configurations, traffic types, and TTI lengths, and controlled dynamically based on actual traffic availability over a shorter time frame. Feedback slots do not need to be in every TTI, as shown in FIG. 6.

The TDD TTI configuration may be determined at a communications controller, a controller in the network that controls one or more communications controllers, or a combination thereof. Multiple TDD TTI configurations may be defined for adaptive TTI TDD systems. In one embodiment, TDD TTI configurations include one or more backward compatible TDD configurations with LTE and one or more TDD TTI configurations with adaptive TTI. For example, a TDD TTI configuration with only long TTIs, with a TTI length longer, for example longer than the 1 ms. In another embodiment, the TDD TTI configurations include configurations with long TTI and configurations with a mixture of short and long TTIs. In an additional embodiment, TDD TTI configurations include only uplink TTIs or only downlink TTIs.

In an inter-band multi-carrier example, the carrier frequencies f1 and f2 are on different bands. Because of the large separation in the frequencies, the downlink-uplink interference is negligible. Although the same TDD TTI configuration used for intra-band multi-carrier may be used, different TDD TTI configurations may also be used.

Figure 7:
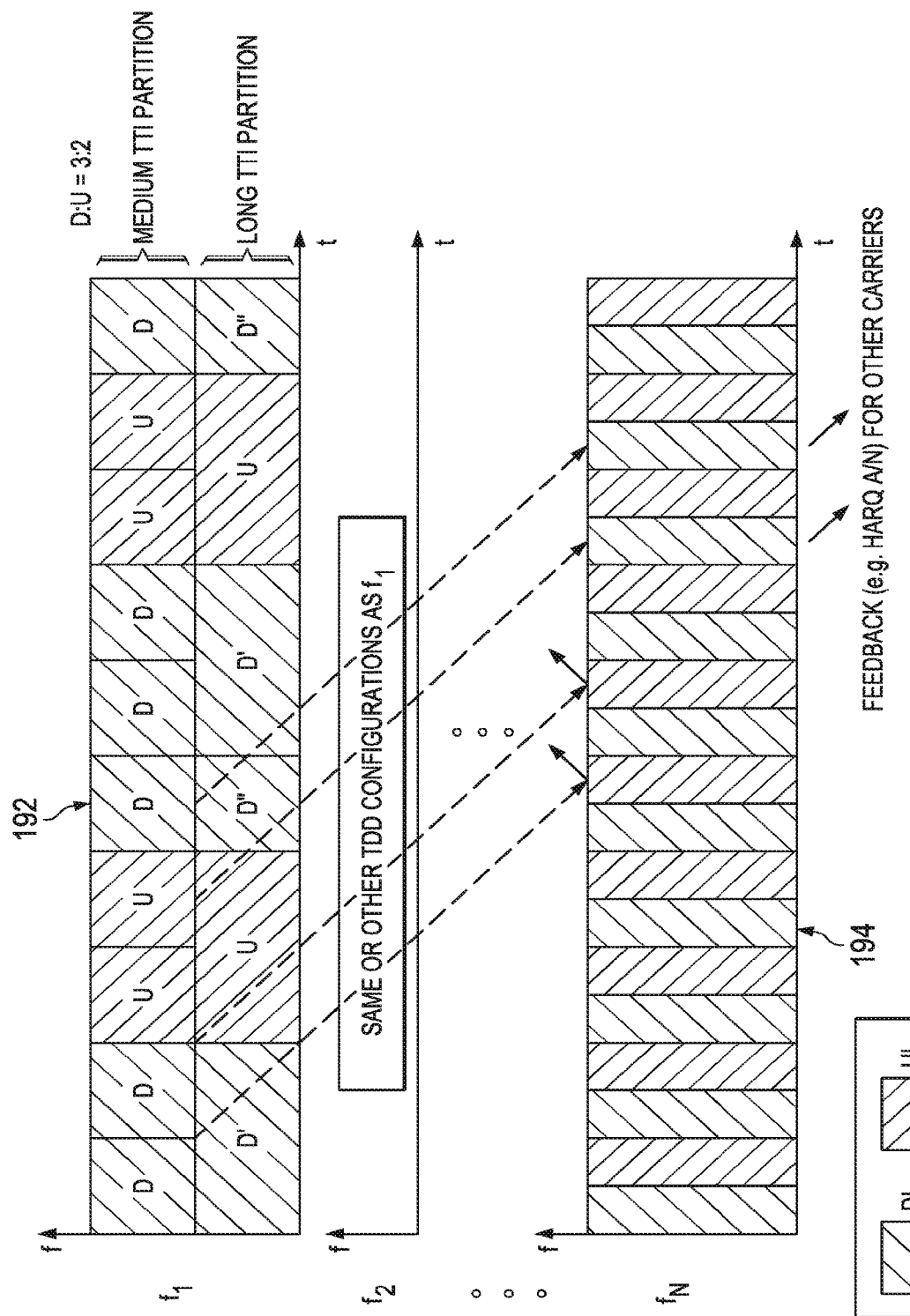
FIG. 7 illustrates the application of different TDD configurations on different carriers.

FIG. 7 illustrates an example frame for adaptive TTI for inter-band multi-carrier TDD systems. Instead of inserting feedback slots in every carrier, one or more carrier(s) are configured with short TTIs. Frame 192 is at frequency f1 has medium and long TTIs, and frame 194 at frequency fN has short TTIs to carry feedback information for other carriers. The short TTIs also carry low latency traffic.

Feedback slots or TTIs for the reverse direction may be inserted to a TTI. The TTI in one direction may be split into multiple chunks by the insertion of TTI/feedback slots for the other direction. Transmit and receive processing is done over the entire TTI. The splitting of a TTI affects the overall duration of the TTI. In one example, illustrated by frame 200 in FIG. 8, the TTI length in one direction includes the time of TTI and feedback slots for the other direction. The ratio of download to upload is 8:2. The long TTI of 5 ms has an actual timing of 5 ms, despite the inserted uplink TTI. In this example, the transmission latency is maintained. However, the long TTI loses capacity from the insertion of the uplink TTI.

In an additional example, illustrated by frame 210 in FIG. 9, the TTI length in one direction excludes the time for TTI and feedback slots in the other direction. The long TTI has an actual timing of 6 ms, with 5 ms for uplink and 1 ms for downlink feedback. The amount of data carried in the long TTI is maintained at the expense of longer transmission latency from the uplink TTI.

In another embodiment, different TDD TTI configurations are used for different carriers. To facilitate fixed HARQ timing when there is no dedicated carrier for feedback, some rules may be applied. For example, the HARQ feedback for downlink or uplink data is transmitted on an uplink or a downlink TTI, respectively, in the same or different carrier after a fixed time, when such a TTI is available. When such a TTI is not available in any carrier, the HARQ feedback may be inserted in a feedback slot in the same carrier as the original data transmission or in another carrier, for example based on predefined rules. For example, the feedback slot is inserted in the lowest frequency carrier for better coverage. In another example, the feedback slot is inserted in a frequency carrier which has the least UL/DL switching overhead based on the TDD TTI configurations.

Figure 10:
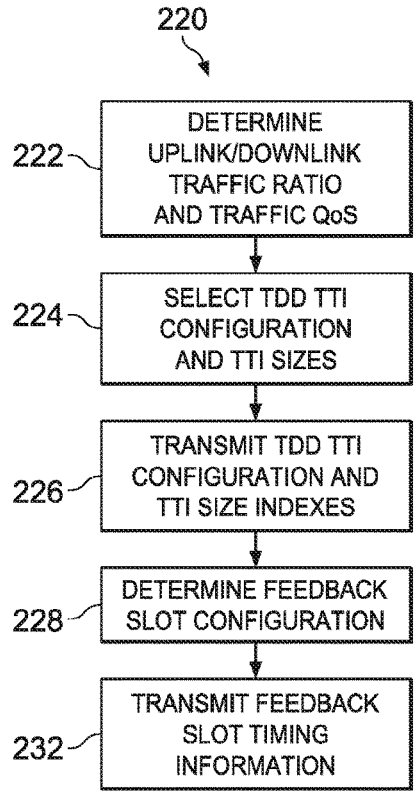
FIG. 10 illustrates a flowchart of an embodiment method of adaptive TTI performed by a communications controller.

FIG. 10 illustrates flowchart 220 for a method for adaptive TTIs performed by a communications controller with a TDD TTI configuration which defines the pattern of the downlink and uplink TTI segments. When a TDD TTI configuration defines the pattern of downlink and uplink adaptive TTIs (i.e. different TTI lengths in the configuration are defined, not just the segments), the TTI sizes may be included in the TDD TTI configuration definition. Initially, in step 222, the communications controller determines the uplink/downlink traffic ratio. This is the ratio of uplink traffic to downlink traffic in a frame. The ratio may depend on the amount of data ready to be downloaded to a UE and/or the amount of data the UE has for upload. Also, the communications controller may determine the traffic QoS (e.g. latency requirement) of different traffic types for downlink and/or uplink.

In step 224, the communications controller selects the TDD TTI configuration and TTI sizes. The TDD TTI configuration may be different for different frames. Alternatively, the TDD TTI configuration is the same for different frames. This process can be done in series or jointly. The TDD TTI configuration defines the patterns of uplink and downlink segments, which is how the uplink and downlink regions are laid out over time (e.g. over a TDD interval such as a radio frame). A particular configuration indicates a certain uplink to downlink traffic ratio. This may be based on the aggregate uplink and downlink traffic loading determined in step 222. For example, the uplink to downlink ratio in the TDD may be set approximately equal to the ratio of data to be uploaded to data to be downloaded. In one example, the uplink segment and the downlink segment are the same size. Other factors affecting the design of a TDD TTI configuration include latency (i.e. the maximum tolerable delay incurred before switching transmission direction) and the UL/DL switching overhead. The communications controller also selects the appropriate TTI sizes. The TTI sizes may be predefined in the system (e.g. short, medium, and long TTIs). This selection may be based on the latency requirements, buffer size, mobility characteristics of the UE, etc. In one example, the uplink segment is larger than the downlink segment when there is more data for uplink thank downlink, and the downlink segment is larger than the uplink segment when there is more data for downlink than uplink. The TTI length may also be based on the TDD TTI configuration. When the data requires low latency, a short TTI length may be selected. When the data does not require a low latency, and the buffer is small, a medium TTI length may be selected. Also, when a low latency is not required, the buffer is not small and the mobility of the user is moderate to high, a medium TTI length may be selected. However, when a low latency is not required, the buffer size is moderate to large, and the mobility of the user is either low or very high, a long TTI length may be selected. The characteristics of uplink and downlink data may be considered.

Adaptive TTI may be used in a single carrier or intra-band multi-carrier TDD operations. In the single carrier or intra-band multi-carrier TDD example, the same TDD TTI configuration may be applied, with different TTI lengths are configured in TDD TTI segments on different carriers. Feedback slots are configurable based on TDD TTI configurations and short term traffic characteristics to adapt the uplink/downlink switching overhead.

In another embodiment, adaptive TTI is performed on inter-band multi-carrier TDD. One or more carriers may be configured with short TTIs to carry feedback information for other carriers. These short TTIs can also carry low latency traffic.

Then, in step 226, the communications controller transmits the TDD TTI configuration selected in steps 224 and/or the indices of TTI sizes selected in step 224. The TTI sizes may be transmitted so the UE knows the TTI sizes to expect. The TDD TTI configuration and/or the indices of TTI sizes may be transmitted on broadcast, multi-cast, or unicast channels. The configurations may be transmitted semi-statically on higher layer signaling based on the changes in traffic characteristics.

In step 228, the communications controller determines the feedback slot configuration. The feedback slot configuration is the information on which TTI lengths in the system are configured with feedback slots. The feedback slot configuration is based on the TDD TTI configurations determined in step 223. Uplink and downlink TTIs may be configured separately. For example, a downlink short TTI may be configured with feedback slots, while a short uplink TTI slot is not configured with feedback slots. The feedback timing information, for example the feedback delay in units of TTIs, may also be determined. The feedback delay may be based on the TTI size. For example, long TTIs may have longer delays. Alternatively, the feedback timing information is predefined.

Figure 11:
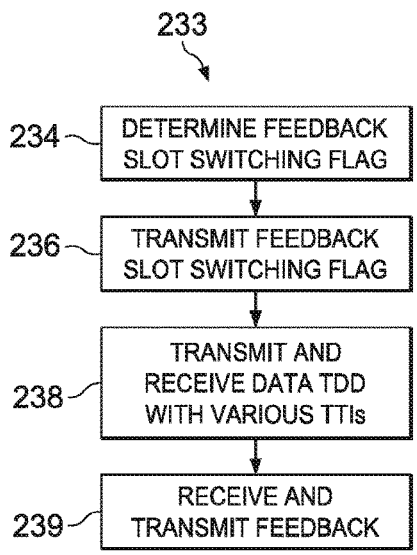
FIG. 11 illustrates a flowchart of another embodiment method of adaptive TTI performed by a communications controller.

FIG. 11 illustrates flowchart 233 for a method for adaptive TTIs performed by a communications controller. The feedback slot configuration is transmitted in step 232. The feedback slot configuration may be sent semi-statically. In one example, the feedback slot configuration is sent via higher layer signaling. The feedback slot configuration may be sent on broadcast, multicast, or unicast channels.

In another embodiment, the feedback slot configuration may not be transmitted explicitly. For example, when the feedback slot timing information is predefined, and the feedback slot is pre-configured to be associated with one or more TTI lengths, then the feedback slot configuration is known implicitly.

The communications controller determines the feedback slot switching flag in step 234. An indication to turn off feedback slots for a period of time, for example for a radio frame, is based on short term traffic characteristics. For example, feedback slots may be disabled when there is no traffic with a low latency requirement, and enabled when there is low latency traffic.

Next, in step 236, the communications controller transmits the feedback slot switching flag determined in step 234. The feedback slot switching flag may be a one bit flag which indicates the disabling or enabling of the feedback slots. The feedback slot switching flag may be sent on a broadcast, unicast, or multicast channel.

Then, in step 238, the communications controller transmits data to a UE and receives data from the UE. TDD data is transmitted and received with various TTIs. In one example, frames have the same TTI configuration for uplink and downlink. Alternatively, uplink and downlink frames have different TDD TTI configurations. There may be different TDD TTI configurations for different carriers. In another example, the same TDD TTI configuration is used for different carriers. The frames may have a structure such as that illustrated in FIG. 6, FIG. 7, FIG. 8, FIG. 9, or another frame structure. TTI splitting may be used to configure the frames.

Finally, in step 239, the communications controller transmits and receives feedback on the feedback slots. The UEs provide feedback on whether they successfully received the data in downlink slots. Also, the communications controller provides feedback to the UE indicating whether the communications controller successfully received the uplink data.

Figure 12:
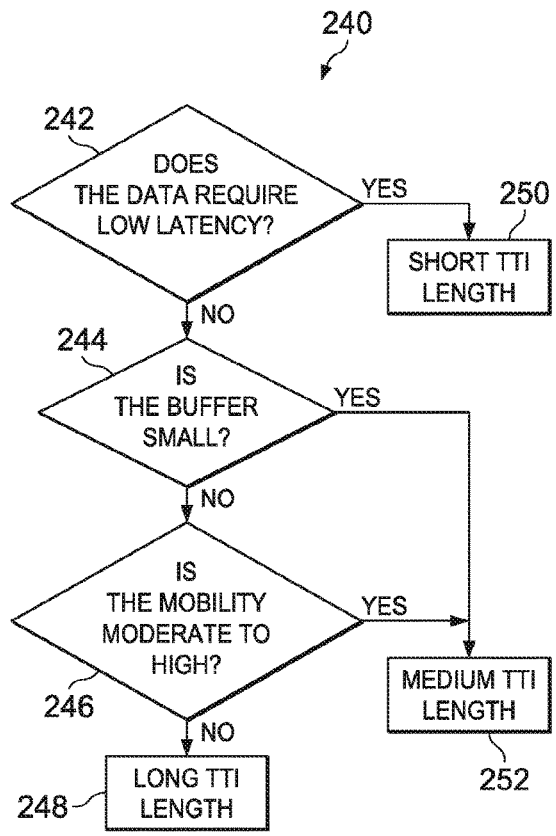
FIG. 12 illustrates an embodiment method of selecting TTI lengths.

FIG. 12 illustrates flowchart 240 for a method of selecting TTI lengths for transporting data in an uplink or downlink channel. Other methods consider other factors and/or have more TTI length designators which may be used to select TTI lengths for data transmission. Initially, in step 242, the method determines whether the data requires low latency. The latency requirement of the data may be determined in accordance with the traffic type of the data. For example, some traffic types, such as voice and mobile gaming, require low latency levels, while other traffic types, such as messaging and e-mail, may have less stringent latency requirements. When the data requires low latency, the method proceeds to step 25o, and selects a short TTI length. When the data may have a moderate or high latency, the method proceeds to step 244.

In step 244, the communications controller determines whether the buffer size for the data is small. The buffer size to store the data may indicate the amount of data to be transported. When large amounts of data are to be transported, longer TTI lengths may provide higher throughput rates by minimizing overhead. However, long TTI lengths may not be useful when only small amounts of data to be transported. For example, when there is not sufficient data to fill the long TTI, a medium TTI may be more efficient. When the data has a small buffer size, the method proceeds to step 252, and selects a medium TTI length. When the data has a large buffer size, the method proceeds to step 246.

The method determines the user's mobility characteristics in step 246. The user's mobility may be low, medium, high, or very high. The degree of mobility may be relative to the network conditions and/or capabilities of the wireless communications device. A user's mobility characteristic may correspond to a rate at which the user is moving. For example, users moving at a higher rate of speed, for example a user communicating in a car, has higher mobility characteristics than users moving at comparatively lower speeds, for example a user walking through a park. A user's mobility characteristic is highly correlated to wireless channel stability, because highly mobile users experience more volatile channel conditions than less mobile users. Moreover, wireless channel stability heavily influences the degree to which link adaptation may be improved through more frequent channel estimation opportunities. That is, users having moderate to high mobility characteristics may achieve better bitrates when using medium or short TTI lengths due to enhanced link adaptation resulting from more frequent channel estimation opportunities. These higher bitrates may outweigh the overhead savings of long TTI lengths, and thus may increase the overall throughput for those users. However, fast link adaptation capabilities may be less beneficial for stationary or slowly moving users, because those users experience relatively channel conditions. As a result, low mobility users may derive higher throughput by exploiting the low overhead nature of long TTI lengths, rather than the faster link adaptation capabilities derived from medium or low TTI lengths. Additionally, users with very high mobility characteristics, for example users moving at very high rates of speed, may derive little to no gain from link adaptation, because channel conditions may be changing too quickly to perform channel estimation with sufficient accuracy to improve the bitrate. Hence, very high mobility users may achieve higher throughput from long TTI lengths. When the user has a moderate to high mobility, the method proceeds to step 252 to select a medium TTI length. On the other hand, when the user has a low or very high mobility, the method proceeds to step 248 and selects a long TTI length.

Figure 13:
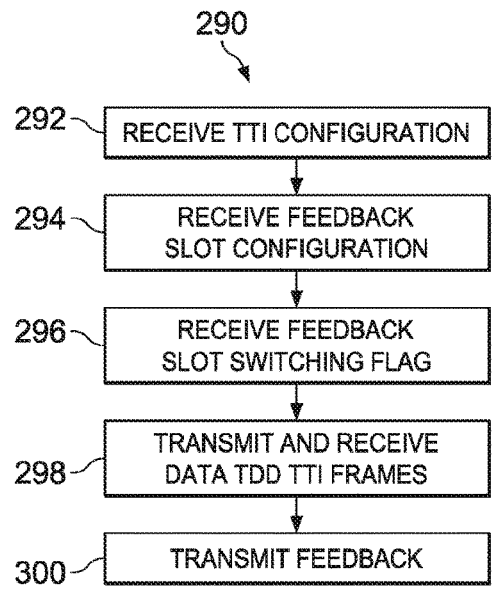
FIG. 13 illustrates a flowchart of an embodiment method of adaptive TTI performed by a user equipment (UE)

FIG. 13 illustrates flowchart 290 for a method of adaptive TTI performed by a UE. Initially, in step 292, the UE receives TDD TTI configuration information from a communications controller. The TDD TTI configuration information may include the uplink and downlink direction patterns. It may also include the configuration of different TTIs based on traffic types. The TDD TTI configuration may be received on a broadcast, multicast, or unicast channel semi-statically on higher layer signaling.

Next, in step 294, the UE receives feedback slot configuration information from the communications controller. The feedback slot configuration may include information on which TTI lengths in the system are configured with feedback slot, and optionally feedback timing information, for example the feedback delay in units of TTIs. The feedback slot configurations may be received semi-statically on a higher layer signaling. Alternatively, a UE derives the feedback slot configuration implicitly when such a configuration is predefined.

Then, in step 296, the UE receives feedback slot switching flags from the communications controller. The feedback slot switching flags indicate whether feedback slots are turned on or turned off for a period of time, for example for a radio frame. The feedback slot switching flag may be received as a one bit flag via broadcast physical channel. Also, the feedback slot switching flag may be received periodically, for example every radio frame.

The UE transmits and receives data in the TDD TTI intervals in step 298. The TDD TTI intervals may be in units of frames, multiple frames, or other larger intervals. The TDD TTI configuration of the frame is based on the TDD TTI configuration received in step 292. The UE uploads data on the uplink segments and downloads data on downlink segments.

In step 300, the UE transmits HARQ feedback on TTIs of the TDD TTI interval to the communications controller. The HARQ feedback is based on data received in step 298. When the data is successfully received, and ack is transmitted, and when the data is not successfully received, a nack is transmitted. The HARQ ACK/NACK is transmitted based on the feedback slot configuration and/or feedback timing information received in step 294. The HARQ ACK/NACK is transmitted in the feedback slots when the feedback slot switching flag indicates that feedback slot is enabled, and is transmitted in regular TTI for the reverse direction when the feedback slot switching flag indicates that feedback slot is disabled. Also, the UE receives feedback from the communications controller based on the uplink data.

Figure 14:
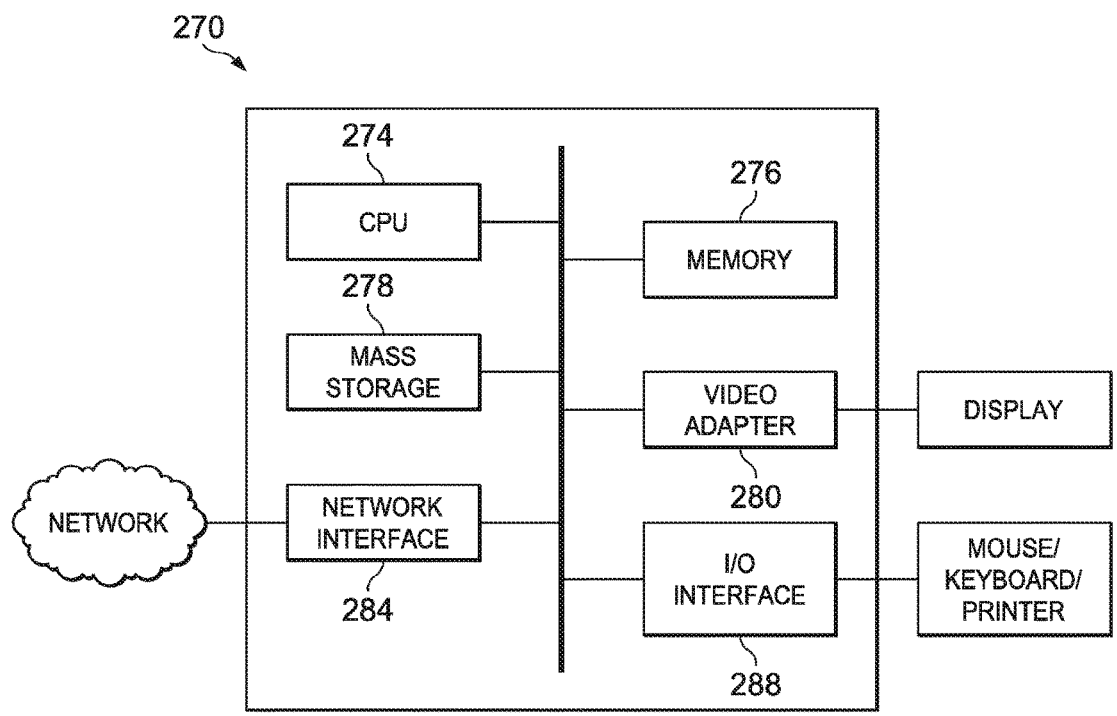
FIG. 14 illustrates a block diagram of an embodiment general-purpose computer system.

FIG. 14 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Embodiment 1

A method for adaptive transmission time intervals (TTIs), the method comprising: transmitting, by a communications controller to a user equipment (UE), a segment of a first TDD TTI configuration of a first TDD interval and a second TDD TTI configuration of the first TDD interval, wherein the first TDD TTI configuration has a first pattern, wherein the second TDD TTI configuration has a second pattern, wherein the first pattern is different than the second pattern, wherein the first TDD TTI configuration has a first uplink TTI segment and a first downlink TTI segment, wherein the second TDD TTI configuration has a second uplink TTI segment and a second downlink TTI segment, wherein the first downlink TTI segment has a first TTI size, and wherein the first uplink TTI segment has a second TTI size; transmitting, by the communications controller to the UE, a first plurality of data on a first TTI in the first downlink TTI segment of the first TDD TTI configurations of the first TDD interval; and receiving, by the communications controller from the UE, a second plurality of data on the first uplink segment of the first TDD TTI configuration of the first TDD interval.

Embodiment 2

The method of embodiment 1, further comprising determining, by the communications controller, the first TDD TTI configuration of the first TDD interval before transmitting, by the communications controller to the UE, the first TDD TTI configuration.

Embodiment 3

The method of embodiment 2, wherein determining the first TDD TTI configuration of the first TDD interval comprises determining the first TTI size of the first downlink TTI segment in accordance with the first TDD TTI configuration of the first TDD interval.

Embodiment 4

The method of embodiment 3, wherein determining the first TTI size of the first downlink segment comprises determining the first TTI size in accordance with a latency requirement of the first plurality of data, a buffer size of the first plurality of data, or a mobility of the UE.

Embodiment 5

The method of embodiment 1, further comprising determining a feedback slot configuration for the first TDD interval in accordance with the first TDD TTI configuration.

Embodiment 6

The method of embodiment 5, further comprising transmitting, by the communications controller to the UE, the feedback slot configuration for the first TDD interval.

Embodiment 7

The method of embodiment 6, further comprising determining feedback delays of the feedback slot configuration in accordance with the first plurality of data.

Embodiment 8

The method of embodiment 1, further comprising: determining a feedback slot switching flag; and transmitting, by the communications controller to the UE, the feedback slot switching flag.

Embodiment 9

The method of embodiment 1, wherein determining the first TDD TTI configuration comprises splitting TTIs.

Embodiment 10

The method of embodiment 9, wherein splitting TTIs comprises: encoding the first plurality of data over a first TTI to produce an encoded TTI wherein the encoded TTI comprises the first plurality of data; and inserting a feedback slot in the encoded TTI in accordance with the first TDD TTI configuration to produce the first TDD interval.

Embodiment 11

The method of embodiment 1, further comprising: determining a third TDD TTI configuration of a second TDD interval, wherein the second TDD TTI configurations comprises a second uplink segment and a second downlink segment; transmitting, by the communications controller to the UE, a second TDD TTI configuration of a second TDD TTI configuration; transmitting, by the communications controller to the UE, a third plurality of data on the second downlink segment of the second TDD interval; and receiving, by the communications controller from the UE, a fourth plurality of data on the second uplink segment of the second TDD interval.

Embodiment 12

The method of embodiment 11, wherein the first TDD TTI configuration is the same as the third TDD TTI configuration.

Embodiment 13

The method of embodiment 11, wherein the first TDD TTI configuration is different than the third TDD TTI configuration.

Embodiment 14

A method for adaptive transmission time intervals (TTIs), the method comprising: receiving, by a user equipment (UE) from a communications controller, a first TDD TTI configuration for a first TDD interval, wherein the first TDD interval comprises a first uplink segment, a first downlink segment, and a first TTI, wherein the first downlink segment has a first TTI size and a second TTI size, and wherein the first TTI size is not equal to the second TTI size; transmitting, by the UE to the communications controller, a first plurality of data on the first uplink segment; and receiving, by the UE from the communications controller, a second plurality of data on the first TTI of the first downlink segment.

Embodiment 15

The method of embodiment 14, further comprising: determining a first feedback delay in accordance with the second plurality of data; and transmitting, by the UE to the communications controller, feedback in accordance with the first feedback delay.

Embodiment 16

The method of embodiment 15, further comprising receiving a feedback slot configuration for the first TDD interval, wherein transmitting the feedback comprises transmitting the feedback in accordance with the feedback slot configuration.

Embodiment 17

The method of embodiment 16, further comprising receiving, by the UE from the communications controller, a feedback delay of the feedback slot configuration, wherein transmitting the first feedback delay comprises transmitting the first feedback delay in accordance with the feedback delay.

Embodiment 18

The method of embodiment 15, further comprising receiving, by the UE from the communications controller, a feedback slot switching flag, wherein transmitting the feedback comprises transmitting the feedback in accordance with the feedback slot switching flag.

Embodiment 19

The method of embodiment 14, further comprising: encoding the first plurality of data over the first TTI to produce an encoded TTI, wherein the encoded TTI comprises the first plurality of data; and inserting a feedback slot in the encoded TTI in accordance with the first TDD TTI configuration to produce the first TDD interval.

Embodiment 20

The method of embodiment 14, further comprising: receiving, by the UE from the communications controller, a third TDD TTI configuration for a second TDD interval, wherein the third TDD TTI configuration comprises a second uplink segment, a second downlink segment, and a second TTI; transmitting, by the UE to the communications controller, a third plurality of data on the second uplink segment; and receiving, by the UE from the communications controller, a fourth plurality of data on the second downlink segment.

Embodiment 21

A communications controller comprising: a processor; and a non-transitory computer readable storage medium storing programming for execution by the processor, the programming including instructions to transmit, to a user equipment (UE), a segment of a first TDD TTI configuration of a first TDD interval and a second TDD TTI configuration of the first TDD interval, wherein the first TDD TTI configuration has a first pattern, wherein the second TDD TTI configuration has a second pattern, wherein the first pattern is different than the second pattern, wherein the first TDD TTI configuration has a first uplink TTI segment and a first downlink TTI segment, wherein the second TDD TTI configuration has a second uplink TTI segment and a second downlink TTI segment, wherein the first downlink TTI segment has a first TTI size, and wherein the first uplink TTI segment has a second TTI size, transmit, to the UE, a first plurality of data on a first TTI in the first downlink TTI segment of the first TDD TTI configurations of the first TDD interval, and receive, by the communications controller from the UE, a second plurality of data on the first uplink segment of the first TDD TTI configuration of the first TDD interval.

Embodiment 22

A user equipment (UE) comprising: a processor; and a non-transitory computer readable storage medium storing programming for execution by the processor, the programming including instructions to receive, from a communications controller, a first TDD TTI configuration for a first TDD interval, wherein the first TDD interval comprises a first uplink segment, a first downlink segment, and a first TTI, wherein the first downlink segment has a first TTI size and a second TTI size, and wherein the first TTI size is not equal to the second TTI size, transmit, by the UE to the communications controller, a first plurality of data on the first uplink segment, and receive, by the UE from the communications controller, a second plurality of data on the first TTI of the first downlink segment.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Example 1

A method for adaptive transmission time intervals (TTIs), the method including: transmitting, by a communications controller to a user equipment (UE), a segment of a first TDD TTI configuration of a first TDD interval and a second TDD TTI configuration of the first TDD interval, where the first TDD TTI configuration has a first pattern, where the second TDD TTI configuration has a second pattern, where the first pattern is different than the second pattern, where the first TDD TTI configuration has a first uplink TTI segment and a first downlink TTI segment, where the second TDD TTI configuration has a second uplink TTI segment and a second downlink TTI segment, where the first downlink TTI segment has a first TTI size, and where the first uplink TTI segment has a second TTI size; transmitting, by the communications controller to the UE, a first plurality of data on a first TTI in the first downlink TTI segment of the first TDD TTI configurations of the first TDD interval; and receiving, by the communications controller from the UE, a second plurality of data on the first uplink segment of the first TDD TTI configuration of the first TDD interval.

Example 2

The method of example 1, further including determining, by the communications controller, the first TDD TTI configuration of the first TDD interval before transmitting, by the communications controller to the UE, the first TDD TTI configuration.

Example 3

The method of one of examples 1 or 2, where determining the first TDD TTI configuration of the first TDD interval includes determining the first TTI size of the first downlink TTI segment in accordance with the first TDD TTI configuration of the first TDD interval.

Example 4

The method of one of examples 1 to 3, where determining the first TTI size of the first downlink segment includes determining the first TTI size in accordance with a latency requirement of the first plurality of data, a buffer size of the first plurality of data, or a mobility of the UE.

Example 5

The method of one of examples 1 to 4, further including determining a feedback slot configuration for the first TDD interval in accordance with the first TDD TTI configuration.

Example 6

The method of one of examples 1 to 5, further including transmitting, by the communications controller to the UE, the feedback slot configuration for the first TDD interval.

Example 7

The method of one of examples 1 to 6, further including determining feedback delays of the feedback slot configuration in accordance with the first plurality of data.

Example 8

The method of one of examples 1 to 7, further including: determining a feedback slot switching flag; and transmitting, by the communications controller to the UE, the feedback slot switching flag.

Example 9

The method of one of examples 1 to 8, where determining the first TDD TTI configuration includes splitting TTIs.

Example 10

The method of one of examples 1 to 9, where splitting TTIs includes: encoding the first plurality of data over a first TTI to produce an encoded TTI where the encoded TTI includes the first plurality of data; and inserting a feedback slot in the encoded TTI in accordance with the first TDD TTI configuration to produce the first TDD interval.

Example 11

The method of one of examples 1 to 10, further including: determining a third TDD TTI configuration of a second TDD interval, where the second TDD TTI configurations includes a second uplink segment and a second downlink segment; transmitting, by the communications controller to the UE, a second TDD TTI configuration of a second TDD TTI configuration; transmitting, by the communications controller to the UE, a third plurality of data on the second downlink segment of the second TDD interval; and receiving, by the communications controller from the UE, a fourth plurality of data on the second uplink segment of the second TDD interval.

Example 12

The method of one of examples 1 to 11, where the first TDD TTI configuration is the same as the third TDD TTI configuration.

Example 13

The method of one of examples 1 to 12, where the first TDD TTI configuration is different than the third TDD TTI configuration.

Example 32

The method of one of examples 1 to 31×2, the first downlink TTI partition of the first downlink segment being aligned with the second downlink TTI partition of the first downlink segment in the first time interval.

Example 33

The method of one of examples 1 to 32×2, the first uplink segment including at least a first uplink TTI partition with a first uplink TTI length, and a second uplink TTI partition with a second uplink TTI length; and the first uplink TTI length being an integer multiples of the second uplink TTI length.

Example 34

The method of one of examples 1 to 33, the first downlink segment including a third uplink TTI partition with a third uplink TTI length; and the first uplink TTI length being an integer multiple of the third uplink TTI length.

Example 14

A method for adaptive transmission time intervals (TTIs), the method including: receiving, by a user equipment (UE) from a communications controller, a first TDD TTI configuration for a first TDD interval, where the first TDD interval includes a first uplink segment, a first downlink segment, and a first TTI, where the first downlink segment has a first TTI size and a second TTI size, and where the first TTI size is not equal to the second TTI size; transmitting, by the UE to the communications controller, a first plurality of data on the first uplink segment; and receiving, by the UE from the communications controller, a second plurality of data on the first TTI of the first downlink segment.

Example 15

The method of example 14, further including: determining a first feedback delay in accordance with the second plurality of data; and transmitting, by the UE to the communications controller, feedback in accordance with the first feedback delay.

Example 16

The method of one of examples 14 or 15, further including receiving a feedback slot configuration for the first TDD interval, where transmitting the feedback includes transmitting the feedback in accordance with the feedback slot configuration.

Example 17

The method of one of examples 14 to 16, further including receiving, by the UE from the communications controller, a feedback delay of the feedback slot configuration, where transmitting the first feedback delay includes transmitting the first feedback delay in accordance with the feedback delay.

Example 18

The method of one of examples 14 to 17, further including receiving, by the UE from the communications controller, a feedback slot switching flag, where transmitting the feedback includes transmitting the feedback in accordance with the feedback slot switching flag.

Example 19

The method of one of examples 14 to 18, further including: encoding the first plurality of data over the first TTI to produce an encoded TTI, where the encoded TTI includes the first plurality of data; and inserting a feedback slot in the encoded TTI in accordance with the first TDD TTI configuration to produce the first TDD interval.

Example 20

The method of one of examples 14 to 19, further including: receiving, by the UE from the communications controller, a third TDD TTI configuration for a second TDD interval, where the third TDD TTI configuration includes a second uplink segment, a second downlink segment, and a second TTI; transmitting, by the UE to the communications controller, a third plurality of data on the second uplink segment; and receiving, by the UE from the communications controller, a fourth plurality of data on the second downlink segment.

Example 21

A method including: transmitting, by a user equipment (UE) to a communications controller, a first data over a first frequency partition during a first time interval using a first uplink segment of a first time division duplex (TDD) transmission time interval (TTI) configuration; and receiving, by the UE from the communications controller, a second data over the first frequency partition during the first time interval using a first downlink segment of the first TDD TTI configuration in the first time interval; the first TDD TTI configuration defining a pattern of downlink TTI segments and uplink TTI segments in the first time interval, at least one segment of the downlink TTI segments having different TTI lengths coexisting for different frequency partitions, and at least one segment of the uplink TTI segments having different TTI lengths coexisting for different frequency partitions.

Example 22

The method of example 21, the first downlink segment including at least a first downlink TTI partition with a first downlink TTI length, and a second downlink TTI partition with a second downlink TTI length; and the first downlink TTI length being an integer multiple of the second downlink TTI length.

Example 23

The method of one of examples 21 or 22, the first downlink segment including a third downlink TTI partition with a third downlink TTI length; and the first downlink TTI length being an integer multiple of the third downlink TTI length.

Example 24

The method of one of examples 21 to 23, the first downlink TTI partition of the first downlink segment being aligned with the second downlink TTI partition of the first downlink segment in the first time interval.

Example 25

The method of one of examples 21 to 24, the first uplink segment including at least a first uplink TTI partition with a first uplink TTI length, and a second uplink TTI partition with a second uplink TTI length; and the first uplink TTI length being an integer multiples of the second uplink TTI length.

Example 26

The method of one of examples 21 to 25, the first downlink segment including a third uplink TTI partition with a third uplink TTI length; and the first uplink TTI length being an integer multiple of the third uplink TTI length.

Example 27

The method of one of examples 21 to 26, further including receiving, by the UE, a feedback slot configuration for the first TDD TTI configuration, the feedback slot configuration including one or more feedback slots; a downlink TTI of the first TDD TTI configuration including a hybrid automatic repeat request (HARQ) feedback slot for an uplink transmission, or an uplink TTI of the first TDD TTI configuration including a HARQ feedback slot for a downlink transmission.

Example 28

The method of one of examples 21 to 27, further including receiving, by the UE, a signaling to indicate a configurable feedback slot for a downlink transmission.

Example 29

A method including: receiving, by a communications controller from a user equipment (UE), a first data over a first frequency partition during a first time interval using a first uplink segment of a first time division duplex (TDD) transmission time interval (TTI) configuration; and transmitting, by the communications controller to the UE, a second data over the first frequency partition during the first time interval using a first downlink segment of the first TDD TTI configuration in the first time interval; the first TDD TTI configuration defining a pattern of downlink TTI segments and uplink TTI segments in the first time interval, at least one segment of the downlink TTI segments having different TTI lengths coexisting for different frequency partitions, and at least one segment of the uplink TTI segments having different TTI lengths coexisting for different frequency partitions.

Example 30

The method of example 29, the first downlink segment including at least a first downlink TTI partition with a first downlink TTI length, and a second downlink TTI partition with a second downlink TTI length; and the first downlink TTI length being an integer multiple of the second downlink TTI length.

Example 31

The method of one of examples 29 or 30, the first downlink segment including a third downlink TTI partition with a third downlink TTI length; and the first downlink TTI length being an integer multiple of the third downlink TTI length.

Example 35

The method of one of examples 29 to 34, further including transmitting, by the communications controller, a feedback slot configuration for the first TDD TTI configuration, the feedback slot configuration including one or more feedback slots; a downlink TTI of the first TDD TTI configuration including a hybrid automatic repeat request (HARQ) feedback slot for an uplink transmission, or an uplink TTI of the first TDD TTI configuration including a HARQ feedback slot for a downlink transmission.

Example 36

The method of one of examples 29 to 35, further including transmitting, by the communications controller, a signaling to indicate a configurable feedback slot for a downlink transmission.

Example 37

A method for wireless communications, including: communicating, by a device, a first uplink transmission and a first downlink transmission in a first time division duplexing (TDD) frame structure configuration in a first carrier; and communicating, by the device, a second uplink transmission and a second downlink transmission in a second TDD frame structure configuration in a second carrier; the first TDD frame structure configuration associated with a first time unit, the second TDD frame structure configuration associated with a second time unit, and the first time unit having a different time length than the second time unit.

Example 38

The method of example 37, where a downlink to uplink ratio is different between the first TDD frame structure configuration and the second TDD frame structure configuration.

Example 39

The method of one of examples 37 or 38, where the first time unit is a two multiple or a four multiple of the second time unit.

Example 40

The method of one of examples 37 to 39, where the first carrier and the second carrier are inter-band carriers.

Example 41

The method of one of examples 37 to 40, where each TTI in the first TDD frame structure and the second TDD frame structure includes at least a control channel, a data channel, pilots and HARQ feedback.

Example 42

A method for wireless communications, including: communicating, by a device, a first uplink transmission and a first downlink transmission in a first time division duplexing (TDD) frame structure configuration in a first carrier of a plurality of inter-band carriers; the plurality of inter-band carriers including a second carrier for communicating a second uplink transmission and a second downlink transmission in a second TDD frame structure configuration; and the first TDD frame structure configuration associated with a first time unit, the second TDD frame structure configuration associated with a second time unit, and the first time unit having a different time length than the second time unit.

Example 43

The method of example 42, where a downlink to uplink ratio is different between the first TDD frame structure configuration and the second TDD frame structure configuration.

Example 44

The method of one of examples 42 or 43, where the first time unit is a two multiple or a four multiple of the second time unit.

Example 45

The method of one of examples 42 to 44, where each TTI in the first TDD frame structure and the second TDD frame structure includes at least a control channel, a data channel, pilots and HARQ feedback.

Example 46

A method for wireless communications, including: receiving, by a user equipment (UE), a first signaling indicating a first time division duplexing (TDD) frame structure configuration; and receiving, by the UE, a second high layer signaling indicating a first feedback slot configuration information; the first TDD frame structure configuration including at least one first uplink and at least one first downlink with a first time duration, and the first feedback slot configuration information including one or more hybrid automatic repeat request (HARQ) feedback slots.

Example 47

The method of example 46, further including: obtaining, by the UE, feedback timing information for indicating feedback delay based on the first feedback slot configuration information.

Example 48

The method of one of examples 46 or 47, where the at least one first uplink includes a HARQ feedback slot for the at least one first downlink within the first time duration.

Example 49

The method of one of examples 46 to 48, where the at least one first downlink includes a HARQ feedback slot for the at least one first uplink within the first time duration.

Example 50

The method of one of examples 46 to 49, where the first TDD frame structure configuration is one of at least two TDD frame structure configurations, and where the at least two TTD frame structure configurations include a second TDD frame structure configuration having at least one second uplink and at least one second downlink with a second time duration.

Example 51

The method of one of examples 46 to 50, where feedback delay of a HARQ feedback slot associated with the first time duration is different from the feedback delay of a HARQ feedback slot associated the second time duration.

Example 52

The method of one of examples 46 to 51, where the first signaling is a high layer signaling.

Example 53

A method for wireless communications, including: sending, by a base station (BS), a first signaling indicating a first time division duplexing (TDD) frame structure configuration; and sending, by the BS, a second high layer signaling indicating a first feedback slot configuration information; the first TDD frame structure configuration including at least one first uplink and at least one first downlink with a first time duration, and the first feedback slot configuration information including one or more hybrid automatic repeat request (HARQ) feedback slots.

Example 54

The method of example 53, further including: sending, by the BS, feedback timing information for indicating feedback delay based on the first feedback slot configuration information.

Example 55

The method of one of examples 53 or 54, the at least one first uplink including a HARQ feedback slot for the at least one first downlink within the first time duration.

Example 56

The method of one of examples 53 to 55, the at least one first downlink including a HARQ feedback slot for the at least one first uplink within the first time duration.

Example 57

The method of one of examples 53 to 56, where the first TDD frame structure configuration is one of at least two TDD frame structure configurations, and where the at least two TTD frame structure configurations include a second TDD frame structure configuration having at least one second uplink and at least one second downlink with a second time duration.

Example 58

The method of one of examples 53 to 57, where a feedback delay of a HARQ feedback slot associated with the first time duration is different from a feedback delay of a HARQ feedback slot associated with the second time duration.

Example 59

The method of one of examples 53 to 58, where the first signaling is a high layer signaling.

Example 60

A method for wireless communications, including: receiving, by a user equipment (UE), a first signaling indicating a first time division duplexing (TDD) frame structure configuration; and receiving, by the UE, a second signaling indicating a first feedback slot configuration, the first TDD frame structure configuration including at least one first uplink direction and at least one first downlink direction, the first TDD frame structure configuration having a first duration, the first feedback slot configuration including one or more hybrid automatic repeat request (HARQ) feedback slots in the first TDD frame structure configuration.

Example 61

The method of example 60, further including: obtaining, by the UE, feedback timing information for indicating a feedback delay based on the first feedback slot configuration.

Example 62

The method of one of examples 60 or 61, where the at least one first uplink direction includes a HARQ feedback slot for the at least one first downlink direction within the first time duration.

Example 63

The method of one of examples 60 to 62, where the at least one first downlink direction includes a HARQ feedback slot for the at least one first uplink direction within the first time duration.

Example 64

The method of one of examples 60 to 63, where the first TDD frame structure configuration is one of at least two TDD frame structure configurations, and where the at least two TTD frame structure configurations include a second TDD frame structure configuration having at least one second uplink direction and at least one second downlink direction, the second TDD frame structure configuration having a second time duration.

Example 65

The method of one of examples 60 to 64, where a feedback delay of a HARQ feedback slot associated with the first time duration is different than a feedback delay of a HARQ feedback slot associated the second time duration.

Example 66

The method of one of examples 60 to 65, where the first signaling and the second signaling is high layer signaling.

Example 67

A method for wireless communications, including: sending, by a base station (BS), a first signaling indicating a first time division duplexing (TDD) frame structure configuration; and sending, by the BS, a second signaling indicating a first feedback slot configuration, the first TDD frame structure configuration including at least one first uplink direction and at least one first downlink direction, the first TDD frame structure configuration having a first duration, the first feedback slot configuration including one or more hybrid automatic repeat request (HARQ) feedback slots in the first TDD frame structure configuration.

Example 68

The method of example 67, further including: sending, by the BS, feedback timing information for indicating feedback delay based on the first feedback slot configuration information.

Example 69

The method of one of examples 67 or 68, the at least one first uplink including a HARQ feedback slot for the at least one first downlink direction within the first time duration.

Example 70

The method of one of examples 67 to 69, the at least one first downlink including a HARQ feedback slot for the at least one first uplink direction within the first time duration.

Example 71

The method of one of examples 67 to 70, where the first TDD frame structure configuration is one of at least two TDD frame structure configurations, and where the at least two TTD frame structure configurations include a second TDD frame structure configuration having at least one second uplink direction and at least one second downlink direction, the second TDD frame structure configuration having a second time duration.

Example 72

The method of one of examples 67 to 71, where a feedback delay of a HARQ feedback slot associated with the first time duration is different than a feedback delay of a HARQ feedback slot associated the second time duration.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for wireless communications, comprising:
receiving, by a user equipment (UE), a first signaling indicating a first time division duplexing (TDD) frame structure configuration; and
receiving, by the UE, a second signaling indicating a first feedback slot configuration, the first TDD frame structure configuration comprising at least one first uplink direction and at least one first downlink direction, the first TDD frame structure configuration having a first time duration, the first feedback slot configuration comprising one or more hybrid automatic repeat request (HARQ) feedback slots in the first TDD frame structure configuration.

2. The method of claim 1, further comprising:
obtaining, by the UE, feedback timing information for indicating a feedback delay based on the first feedback slot configuration.

3. The method of claim 1, wherein the at least one first uplink direction comprises a HARQ feedback slot for the at least one first downlink direction within the first time duration.

4. The method of claim 1, wherein the at least one first downlink direction comprises a HARQ feedback slot for the at least one first uplink direction within the first time duration.

5. The method of claim 1, wherein the first TDD frame structure configuration is one of at least two TDD frame structure configurations, and wherein the at least two TTD frame structure configurations comprise a second TDD frame structure configuration having at least one second uplink direction and at least one second downlink direction, the second TDD frame structure configuration having a second time duration.

6. The method of claim 5, wherein a feedback delay of a HARQ feedback slot associated with the first time duration is different than a feedback delay of a HARQ feedback slot associated the second time duration.

7. The method of claim 1, wherein the first signaling and the second signaling are high layer signaling.

8. A user equipment (UE) comprising:
a non-transitory memory storage comprising instructions; and
one or more processors in communication with the non-transitory memory storage, wherein the one or more processors execute the instructions to:
receive a first signaling indicating a first time division duplexing (TDD) frame structure configuration; and
receive a second signaling indicating a first feedback slot configuration, the first TDD frame structure configuration comprising at least one first uplink direction and at least one first downlink direction, the first TDD frame structure configuration having a first time duration, the first feedback slot configuration comprising one or more hybrid automatic repeat request (HARQ) feedback slots in the first TDD frame structure configuration.

9. The UE of claim 8, wherein the one or more processors execute the instructions to obtain feedback timing information for indicating a feedback delay based on the first feedback slot configuration.

10. The UE of claim 8, wherein the at least one first uplink direction comprises a HARQ feedback slot for the at least one first downlink direction within the first time duration.

11. The UE of claim 8, wherein the at least one first downlink direction comprises a HARQ feedback slot for the at least one first uplink direction within the first time duration.

12. The UE of claim 8, wherein the first TDD frame structure configuration is one of at least two TDD frame structure configurations, and wherein the at least two TTD frame structure configurations comprise a second TDD frame structure configuration having at least one second uplink direction and at least one second downlink direction, the second TDD frame structure configuration having a second time duration.

13. The UE of claim 12, wherein a feedback delay of a HARQ feedback slot associated with the first time duration is different than a feedback delay of a HARQ feedback slot associated the second time duration.

14. The UE of claim 8, wherein the first signaling and the second signaling are high layer signaling.

15. A method for wireless communications, comprising:
sending, by a base station (BS), a first signaling indicating a first time division duplexing (TDD) frame structure configuration; and
sending, by the BS, a second signaling indicating a first feedback slot configuration, the first TDD frame structure configuration comprising at least one first uplink direction and at least one first downlink direction, the first TDD frame structure configuration having a first time duration, the first feedback slot configuration comprising one or more hybrid automatic repeat request (HARQ) feedback slots in the first TDD frame structure configuration.

16. The method of claim 15, further comprising:
sending, by the BS, feedback timing information for indicating feedback delay based on the first feedback slot configuration information.

17. The method of claim 15, the at least one first uplink comprising a HARQ feedback slot for the at least one first downlink direction within the first time duration.

18. The method of claim 15, the at least one first downlink comprising a HARQ feedback slot for the at least one first uplink direction within the first time duration.

19. The method of claim 15, wherein the first TDD frame structure configuration is one of at least two TDD frame structure configurations, and wherein the at least two TTD frame structure configurations comprise a second TDD frame structure configuration having at least one second uplink direction and at least one second downlink direction, the second TDD frame structure configuration having a second time duration.

20. The method of claim 19, wherein a feedback delay of a HARQ feedback slot associated with the first time duration is different than a feedback delay of a HARQ feedback slot associated the second time duration.

21. A base station (BS) comprising:
a non-transitory memory storage comprising instructions; and
one or more processors in communication with the non-transitory memory storage, wherein the one or more processors execute the instructions to:
send a first signaling indicating a first time division duplexing (TDD) frame structure configuration; and
send a second signaling indicating a first feedback slot configuration, the first TDD frame structure configuration comprising at least one first uplink direction and at least one first downlink direction, the first TDD frame structure configuration having a first time duration, the first feedback slot configuration comprising one or more hybrid automatic repeat request (HARQ) feedback slots in the first TDD frame structure configuration.

22. The BS of claim 21, wherein the programming further includes instructions to:
send feedback timing information for indicating feedback delay based on the first feedback slot configuration information.

23. The BS of claim 21, the at least one first uplink comprising a HARQ feedback slot for the at least one first downlink direction within the first time duration.

24. The BS of claim 21, the at least one first downlink comprising a HARQ feedback slot for the at least one first uplink direction within the first time duration.

25. The BS of claim 21, wherein the first TDD frame structure configuration is one of at least two TDD frame structure configurations, and wherein the at least two TTD frame structure configurations comprise a second TDD frame structure configuration having at least one second uplink direction and at least one second downlink direction, the second TDD frame structure configuration having a second time duration.

26. The BS of claim 25, wherein a feedback delay of a HARQ feedback slot associated with the first time duration is different than a feedback delay of a HARQ feedback slot associated the second time duration.

* * * * *

UNITED STATES PATENT AND TRADEMARK OFFICE
CERTIFICATE OF CORRECTION

PATENT NO. : 10,271,331 B2
APPLICATION NO. : 16/108589
DATED : April 23, 2019
INVENTOR(S) : Kelvin Kar Kin Au It is certified that error appears in the above-identified patent and that said Letters Patent is hereby corrected as shown below:

In the Claims

Column 26, Line 7, Claim 5, delete "TTD" and insert --TDD--.

Column 26, Line 49, Claim 12, delete "TTD" and insert --TDD--.

Column 27, Line 20, Claim 19, delete "TTD" and insert --TDD--.

Column 28, Line 24, Claim 25, delete "TTD" and insert --TDD--.

Signed and Sealed this
Sixteenth Day of July, 2019

Andrei Iancu
*Director of the United States Patent and Trademark Office*